UNITED STATES PATENT OFFICE.

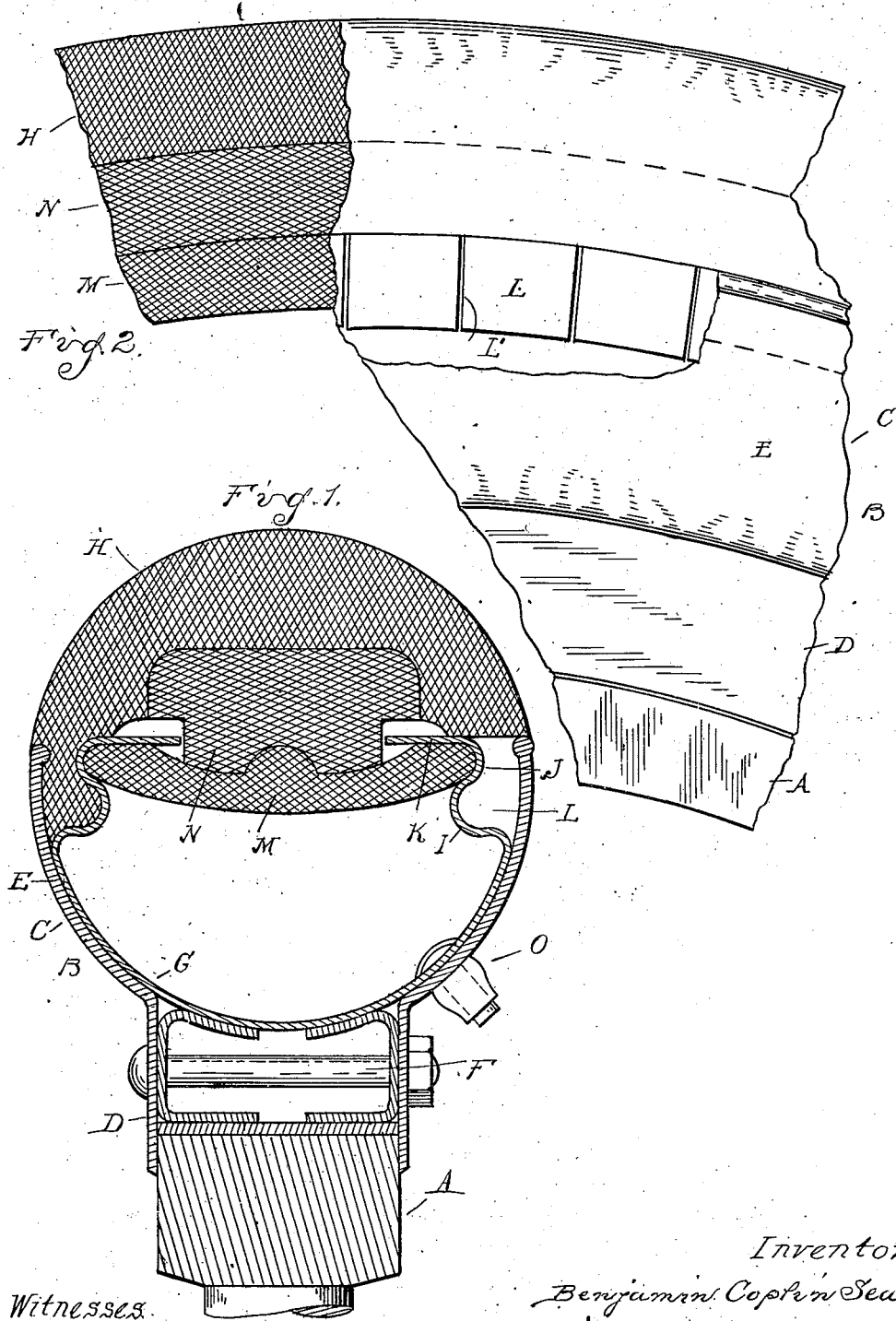

BENJAMIN COPLIN SEATON, OF DETROIT, MICHIGAN.

VEHICLE-TIRE.

1,077,310.   Specification of Letters Patent.   Patented Nov. 4, 1913.

Application filed December 2, 1909.   Serial No. 531,104.

*To all whom it may concern:*

Be it known that I, BENJAMIN COPLIN SEATON, a citizen of the United States of America, residing at Detroit, in the county of Wayne and State of Michigan, have invented certain new and useful Improvements in Vehicle-Tires, of which the following is a specification, reference being had therein to the accompanying drawings.

The invention relates to pneumatic vehicle tires, and it is the object of the invention—first, to avoid blow-outs; second, to obtain a construction which is self-healing in case of a puncture, without the use of any liquid; third, to prevent rim-cutting of the tire in case of deflation of the latter.

With these and other objects in view, the invention consists in certain features of construction as hereinafter set forth.

In the drawings—Figure 1 is a cross section through the tire, as applied to a vehicle felly; Fig. 2 is a sectional side elevation thereof.

With the usual type of pneumatic tires, the pressure of air within the tube operates to place all portions of the tire case under tension. As a consequence, there is a strong tendency to enlarge any puncture or rupture initially formed in the case.

One of the features of my invention is the placing of a section of the tire covering the tread portion under compression, the compression being intensified by the inflation of the pneumatic tube, whereby any puncture formed will be closed.

Another feature of the invention is the substitution of a metallic case for the fabric case usually employed in the construction of the body portion of the tire, and this I preferably accomplish by forming the chamber for the compressed air within a hollow metallic rim.

More in detail, A is the felly of a vehicle wheel of any suitable construction.

B is a metallic rim preferably formed of annular cheek plates C, having flat portions D embracing the sides of the felly, and segmental portions E for receiving the tire. The cheek plates C are clamped to the felly by bolts F.

G is a metallic rim adapted to fit within the segmental portion C of the cheek plates. This rim G is fashioned to engage the tread portion H of the tire case, and when in position between the cheek plates C to hold said member H from disengagement. As shown, the member G is bent to form a groove I with an outwardly-curved portion J, terminating in an inwardly-extending flanged portion K. The portion I forms the seat for receiving lugs L on the member H, while the portions J form a seat for the opposite edges of a member M arranged within the case.

The member M is formed of resilient compressible material, preferably having a large percentage of rubber, and is normally of a curved or segmental cross section, bowed toward the rim or felly of the wheel.

N is a filler member arranged between the members M and H, and bearing against the central portion of the latter intermediate the inwardly-extending flange K of the metallic member G. The construction and arrangement is such that the edges of the member M will seat in the portion J of the member G, and when air under pressure is introduced into the hollow member G an air tight joint is formed. Furthermore, the pressure of air acting upon the member M will tend to force the central portion thereof outward, and in so doing will cause a lateral compression thereof, and an outward pressure on the seat portions J of the member G. Several important functions are thus performed—first, the outward pressure on the portions J and I will tightly clamp the lugs L of the tread portion H and prevent disengagement of the latter; second, the airtight joint between the member M and the seat portions J is maintained; third, the member M is laterally compressed; and, fourth, this member is resiliently forced outward to form the supporting cushion for the tread portion H.

It will be understood from the description already given that the members G and M together form a pneumatic tube in which the compressed air forming the cushion for the tire is contained. This air may be introduced through a suitable valve connection O on the member G, and pass through one of the cheek plates C. In assembling the parts, the member M is first engaged with the member G, and with the seat portions J thereof, after which the member H is engaged with the member G, which is accomplished by turning outward the lug portion L, these being separated from each other by the slits L'. The assembled parts are then engaged with the wheel by the removal of one of the cheek plates C, and after the latter is replaced the tire may be inflated. When inflated, the tread portion H will receive the full pressure of the air within the member G, operating thereon through the medium of the members M and N.

In use, the tire will be as resilient as the ordinary type of pneumatic tire, but as has been already stated, the portion M is under compression, instead of being under tension. Consequently, if a puncture should be formed, penetrating the member M, as soon as the point is removed the internal pressure in the member M will cause the closing of the cut, so that the air cannot escape. On the other hand, all danger of a blow-out or rupture of the upper portion of the tire is prevented by the strength of the metallic member G reinforced by the cheek members C.

If through any cause the tire becomes deflated, the tread portion H no longer sustained by the air cushion will be forced inward, but in so doing it will be seated upon the flat flanges K. These are of sufficient strength to sustain the load, and permit the vehicle to travel without injury to the tread until repairs can be made.

What I claim as my invention is:

1. A pneumatic tire, comprising a hollow metallic rim, a flexible tread member engaging said rim, an inner rim within the first-mentioned rim having a bearing on said tread member, an inwardly bowed compressible member having a bearing on said inner rim and forming an air tight joint therewith, said bowed member also having a central bearing upon the tread member.

2. A pneumatic tire, comprising a hollow metallic rim, a flexible tread member engaging said rim, an inwardly bowed compressible member forming an air tight joint with said rim and having a bearing on said tread member, and flanges upon said rim forming a seat for supporting said tread, when the tire is deflated.

3. A pneumatic tire, comprising a hollow metallic rim, a flexible tread member having a bearing on said rim, an inwardly bowed compressible member forming an air-tight joint with said rim, and a filler member interposed between the tread member and the inwardly bowed member for maintaining the latter bowed.

4. A pneumatic tire, comprising an outer hollow metallic rim, a tread portion secured to and supported by said rim, a second metallic rim arranged within the outer rim and having laterally extending spaced portions, a flexible member engaging said spaced portions and serving to form an air-tight connection therebetween.

5. A pneumatic tire, comprising an outer hollow metallic casing, a flexible tread member, means for anchoring said tread member to said rim, a second rim arranged within the outer rim and having the upper ends thereof interlocked with the flexible tread, said upper ends being spaced, and a flexible member forming an air-tight connection between said upper ends.

6. A pneumatic tire, comprising a hollow metallic rim, a flexible tread member engaging said rim, and an inwardly bowed flexible member normally under compression forming an air tight connection with said rim and adapted to cushion said tread.

7. A pneumatic tire comprising a rim portion, a tread, and an inwardly bowed compressible member forming an air tight connection with the rim and adapted to cushion said tread.

8. A pneumatic tire comprising a rim and a flexible member engaging said rim, said flexible member being inwardly bowed and normally under compression for the purpose described.

In testimony whereof I affix my signature in presence of two witnesses.

BENJAMIN COPLIN SEATON.

Witnesses:
NELLIE KINSELLA,
JAMES P. BARRY.